United States Patent
Petrangeli et al.

(10) Patent No.: US 12,002,246 B2
(45) Date of Patent: Jun. 4, 2024

(54) SYSTEMS FOR DIGITAL IMAGE COMPRESSION USING CONTEXT-BASED PIXEL PREDICTOR SELECTION

(71) Applicant: Adobe Inc., San Jose, CA (US)

(72) Inventors: Stefano Petrangeli, Mountain View, CA (US); Viswanathan Swaminathan, Saratoga, CA (US); Haoliang Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 719 days.

(21) Appl. No.: 17/148,928

(22) Filed: Jan. 14, 2021

(65) Prior Publication Data

US 2022/0222866 A1 Jul. 14, 2022

(51) Int. Cl.
| | | |
|---|---|---|
| *G06T 9/40* | (2006.01) | |
| *G06N 7/01* | (2023.01) | |
| *G06T 3/40* | (2006.01) | |
| *H04N 19/13* | (2014.01) | |
| *H04N 19/169* | (2014.01) | |
| *H04N 19/186* | (2014.01) | |
| *H04N 19/96* | (2014.01) | |

(52) U.S. Cl.
CPC .................. *G06T 9/40* (2013.01); *G06N 7/01* (2023.01); *G06T 3/40* (2013.01); *H04N 19/13* (2014.11); *H04N 19/186* (2014.11); *H04N 19/1883* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 10,049,427 B1* | 8/2018 | Lachowsky | H04N 19/91 |
| 2019/0037226 A1* | 1/2019 | Yang | H04N 19/59 |
| 2020/0084463 A1* | 3/2020 | Abraham | H04N 19/136 |

OTHER PUBLICATIONS

"FLIF—Free Lossless Image Format", FLIF Website [retrieved Dec. 7, 2020]. Retrieved from Internet <https://flif.info/index.html>., 7 pages.

Aiazzi, Bruno et al., "Context modeling for near-lossless image coding", IEEE Signal Processing Letters vol. 9, Issue 3 [retrieved Feb. 19, 2021]. Retrieved from the Internet <https://doi.org/10.1109/97.995822>., Mar. 2002, 4 pages.

(Continued)

*Primary Examiner* — Leon Viet Q Nguyen
(74) *Attorney, Agent, or Firm* — FIG. 1 Patents

(57) ABSTRACT

In implementations of systems for digital image compression using context-based pixel predictor selection, a computing device implements a compression system to receive digital image data describing pixels of a digital image. The compression system groups first differences between values of the pixels and first prediction values of the pixels into context groups. A pixel predictor is determined for each of the context groups based on a compression criterion. The compression system generates second prediction values of the pixels using the determined pixel predictor for pixels corresponding to the first differences included in each of the context groups. Second differences between the values of the pixels and the second prediction values of the pixels are grouped into different context groups. The compression system compresses the digital image using entropy coding based on the different context groups.

20 Claims, 8 Drawing Sheets

(56) References Cited

OTHER PUBLICATIONS

Chen, Tong et al., "Neural Image Compression via Non-Local Attention Optimization and Improved Context Modeling", arXiv Preprint, arXiv.org [retrieved Feb. 19, 2021]. Retrieved from the Internet <https://arxiv.org/pdf/1910.06244.pdf>., Oct. 11, 2019, 13 pages.

Wang, Jiong et al., "Lossless Compression Algorithm Based on Context Tree", ICVIP 2019: Proceedings of the 3rd International Conference on Video and Image Processing [retrieved Feb. 19, 2021]. Retrieved from the Internet <https://doi.org/10.1145/3376067.3376110>., Dec. 2019, 6 pages.

Weinberger, Marcelo J. et al., "Applications of universal context modeling to lossless compression of gray-scale images", IEEE Transactions on Image Processing, vol. 5, No. 4 [retrieved Feb. 19, 2021]. Retrieved from the Internet <https://doi.org/10.1109/83.491334>., Apr. 1996, 12 pages.

Wu, X. et al., "Lossless interframe image compression via context modeling", In Proceedings DCC '98 Data Compression Conference (Cat. No. 98TB100225), Snowbird, UT [retrieved Feb. 19, 20201]. Retrieved from the Internet <https://doi.org/10.1109/DCC.1998.672169>., Apr. 1998, 10 pages.

Wu, Xiaolin et al., "Context-Based Lossless Interband Compression—Extending CALIC", IEEE Transactions on Image Processing, vol. 9, Issue 6 [retrieved Feb. 19, 2021]. Retrieved from the Internet <https://pdfs.semanticscholar.org/0100/c4945d0421ec1a1f900f2a8988ecb58f1e8f.pdf>., Jun. 2000, 28 pages.

\* cited by examiner

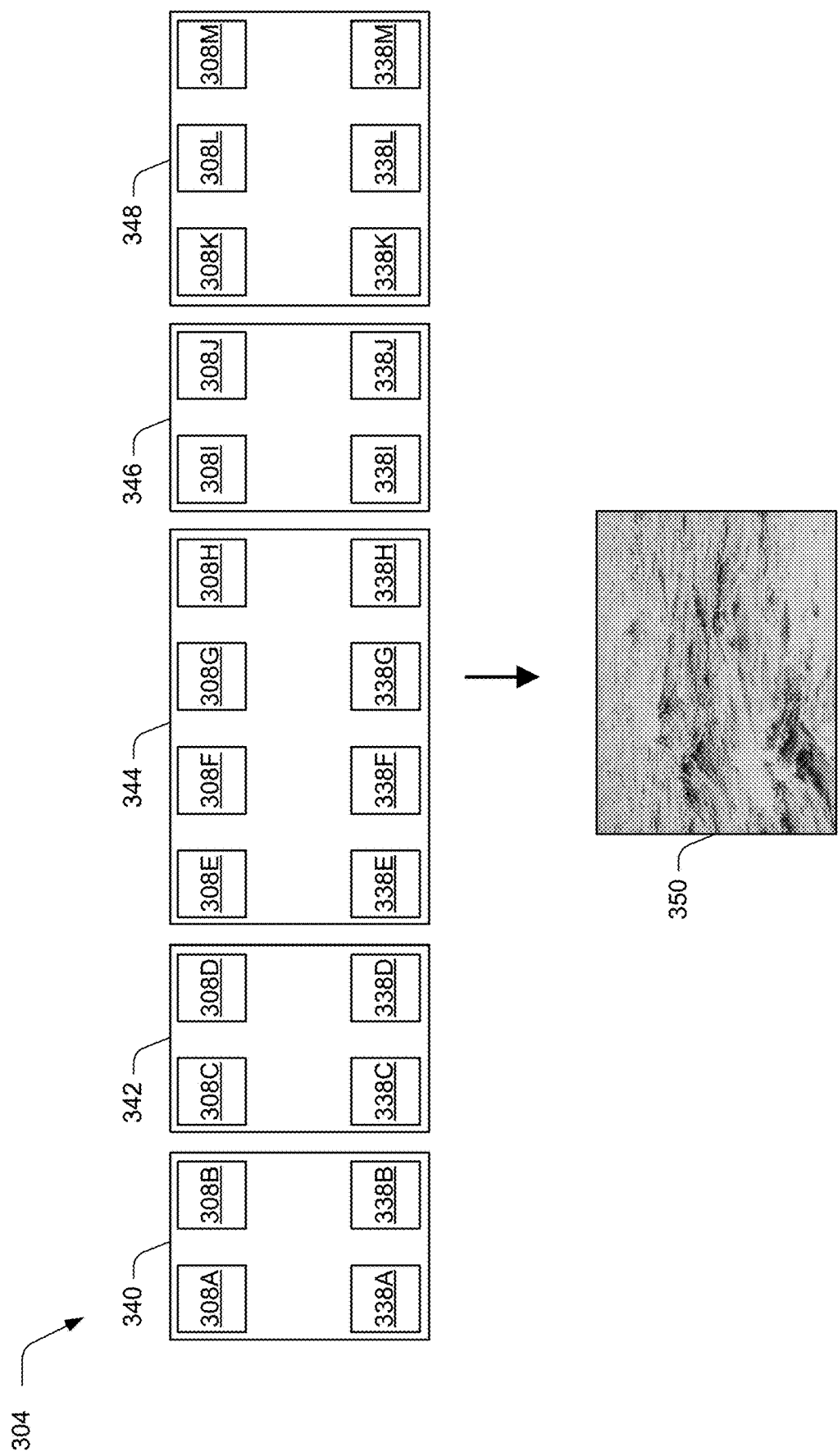

SYSTEMS FOR DIGITAL IMAGE COMPRESSION USING CONTEXT-BASED PIXEL PREDICTOR SELECTION

BACKGROUND

Data compression systems generate compressed data by encoding a representation of the data using fewer bits than a number of bits used to represent the original data. The compressed data is storable on a storage device or transmittable via a network using significantly fewer computing resources than would be consumed by storing or transmitting the original data. To compress digital image data that describes pixels of a digital image, conventional systems predict pixel values for the pixels using a pixel predictor. For example, the pixel predictor generates a predicted pixel value for a particular pixel using values of pixels that are adjacent to the particular pixel. Residual values are computed as a differences between pixel values and corresponding predicted pixel values. These residual values are grouped into groups of similar residual values. The digital image is then compressed using entropy coding based on the groups of similar residual values.

SUMMARY

Techniques and systems are described for digital image compression using context-based pixel predictor selection. In an example, a computing device implements a compression system to receive digital image data describing pixels of a digital image. The compression system predicts first prediction values of the pixels and then groups first differences between values of the pixels and the first prediction values into context groups. A pixel predictor is determined for each of the context groups based on a compression criterion.

The compression system generates second prediction values of the pixels using the determined pixel predictor for pixels corresponding to the first differences included in each of the context groups. Second differences between the pixel values and the second prediction values of the pixels are grouped into different context groups. In one example, the compression system compresses the digital image using entropy coding based on the different context groups.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIGS. 3A, 3B, and 3C illustrate an example of grouping residual values of pixels into context groups, determining a pixel predictor for each of the context groups, and grouping new residual values of the pixels into different context groups.

DETAILED DESCRIPTION

Overview

Figure 1:
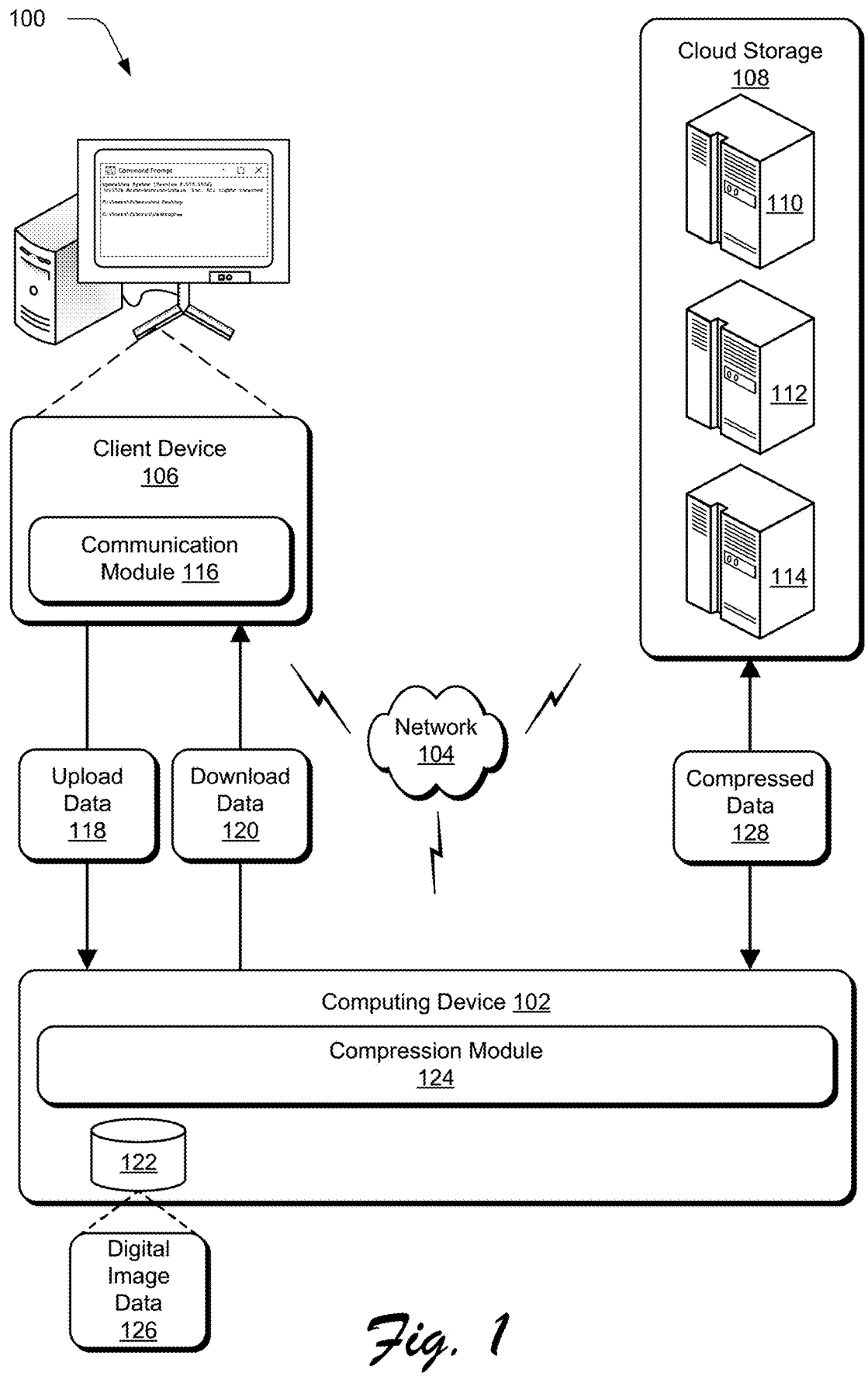
FIG. 1 is an illustration of an environment in an example implementation that is operable to employ digital systems and techniques for digital image compression using context-based pixel predictor selection as described herein.

Conventional systems for compressing digital images predict pixel values for pixels depicted in the digital images using pixel predictors. These conventional systems compute residual values as differences between values of the pixels and the predicted pixel values. Once computed, the residual values are grouped into groups of similar residual values. The digital images are then compressed using entropy coding based on the groups of similar residual values. However, conventional systems do not leverage relationships of pixels corresponding to residual values included in the groups of similar residual values. As a result, conventional systems are not capable of efficiently compressing the digital images.

To overcome the limitations of conventional systems, techniques and systems are described for digital image compression using context-based pixel predictor selection. In one example, a computing device implements a compression system to receive digital image data describing pixels of a digital image. The compression system generates first prediction values of the pixels and then groups first differences between values of the pixels and the first prediction values into context groups. For example, the compression system computes residual values for the pixels as the differences between the values of the pixels and the corresponding first prediction values.

Each of these residual values is associated with a set of properties. In an example, a residual value corresponding to a particular pixel has values of pixels that are adjacent to the particular pixel in the digital image included in the set of properties associated with the residual value. In this example, a context is defined as a specific combination of properties, for example, a particular context is defined as multiple pixels that are adjacent to the particular pixel having values below some threshold value.

The compression system groups the residual values into context groups of similar residual values. In this manner, the compression system groups the residual values into the context groups such that pixels corresponding to residual values grouped together in a particular context group have similar statistical properties. A pixel predictor is determined for each of the context groups based on a compression criterion. For example, the compression criterion is a minimum average number of bits usable to express residual values computed from predicted pixel values and the compression system determines the pixel predictor from a set of available pixel predictors.

The compression system generates second prediction values of the pixels using the determined pixel predictor for pixels corresponding to residual values included in each of the context groups. In an example, the compression system computes new residual values for the pixels as differences between the values of the pixels and the corresponding second prediction values. These new residual values are grouped into different context groups.

In one example, the compression system compresses the digital image using entropy coding based on the different context groups. By leveraging relationships (e.g., similar statistical properties) of pixels corresponding to residual values included in the context groups to determine a pixel predictor for each of the context groups, the described systems demonstrate improved compression performance relative to compression performance of conventional systems. These improvements are verified and validated using a corpus of digital images and compressing the corpus using the described systems and a conventional compression system. For example, the corpus includes both digital photographs and synthetic digital images and the described systems are capable of compressing the corpus using fewer bits than the conventional system. This improvement is demonstrated in both pre-encoding and post-encoding examples for lossless compression. Although described as improving lossless compression systems, the described systems also improve performance in lossy compression systems.

In another example, the described systems further improve compression performance relative to conventional systems by determining an additional pixel predictor for each of the different context groups. In this example, the compression system determines an additional pixel predictor for each of the different context groups based on the compression criterion. The compression system generates third prediction values of the pixels using the determined additional pixel predictor for pixels corresponding to new residual values included in each of the different context groups. For example, additional new residual values are computed as differences between the pixel values and the corresponding third prediction values. These additional new residual values are grouped into additional context groups and the compression system compresses the digital image using entropy coding based on the additional context groups. In this way, the described systems further improve compression performance relative to conventional systems.

It is to be appreciated that the described systems are not limited to determining additional pixel predictors for the different context groups. Rather, the described systems are capable of determining pixel predictors for pixels corresponding to residual values included context groups, predicting pixel values using the determined pixel predictors, computing new residual values from the predicted pixel values, and grouping the new residual values into different context groups in any number of iterations to further improve compression performance. For example, the described systems are capable of iteratively determining pixel predictors and grouping residual values computed from predicted pixel values of the determined pixel predictors into context groups until a choice of the pixel predictors converges. In this example, the choice of the pixel predictors converges if pixel predictors determined for a threshold number of pixels remain the same before and after an iteration. The described systems are also capable of stopping early (e.g., before convergence) based on compression performance versus compression speed trade-offs which is not possible in conventional systems that do not leverage relationships of pixels corresponding to residual values included in groups of similar residual values.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a client device 106 and cloud storage 108 which are each connected to the network 104. The cloud storage 108 is illustrated to include server devices 110-114 that provide scalable processing and/or data storage capacity which is made available to the client device 106 via the network 104. For example, the server devices 110-114 store digital content data of the client device 106 such as digital images, digital videos, digital audio, and so forth.

The client device 106 is illustrated to include a communication module 116 which is implementable by the client device 106 to transmit and/or receive data via the network 104. For example, the client device 106 implements the communication module 116 to transmit upload data 118 and/or receive download data 120 via the network 104. In one example, the upload data 118 describes digital content data for storage on the server devices 110-114 of the cloud storage 108. In a similar example, the download data 120 describes digital content data retrieved via the network 104 from storage devices of the server devices 110-114 for consumption by the client device 106. In the illustrated example, the client device 106 transmits the upload data 118 to the computing device 102 and receives the download data 120 from the computing device 102. However, in other examples, the client device 116 transmits the upload data 118 to the cloud storage 108 and receives the download data 120 from the cloud storage 108 via the network 104.

The computing device 102 includes a storage device 122 and a compression module 124. For example, the compression module 124 is illustrated as having, transmitting, and/or receiving the upload data 118 and the download data 120. The storage device 122 is illustrated to include digital image data 126 which describes digital images such as photographs, graphic images, frames of digital video, and so forth.

In one example, the digital image data 126 describes digital artwork such as digital artwork that includes both photographs and graphic images.

Consider an example in which the client device 106 implements the communication module 116 to transmit the upload data 118 to the computing device 102 for storage of the upload data 118 in the cloud storage 108. In this example, the computing device 102 receives the upload data 118 via the network 104 and the upload data 118 includes the digital image data 126. For example, the compression module 124 provisions storage capacity of the server devices 110-114 for storing the digital image data 126 in the cloud storage 108.

Continuing this example, the compression module 124 determines how much storage capacity of the server devices 110-114 will be consumed by storing the digital image data 126 in the cloud storage 108. In order to reduce an amount of storage capacity consumed by storing the digital image data 126, the compression module 124 compresses the digital image data 126. For example, the compression module 124 processes the digital image data 126 to generate compressed data 128.

The compression module 124 generates the compressed data 128 using a data compression algorithm such as context adaptive binary arithmetic coding, context adaptive variable length coding, and so forth. The compressed data 128 describes a representation of the digital image data 126. In a lossless compression example, this representation is usable to completely reproduce the digital image data 126. In a lossy compression example, the representation is not usable to completely reproduce the digital image data 126 but the representation is usable to produce an approximation of the digital image data 126.

In one example, the compression module 124 generates the compressed data 128 by predicting pixel values for pixels of a digital image described by the digital image data 126. In this example, the compression module 124 predicts the pixel values using a pixel predictor such as using a scanline traversal method in which lines of pixels of the digital image are scanned line-by-line from left to right. When predicting a pixel value for a particular pixel in this manner, the compression module 124 uses a value of a pixel above the particular pixel and a value of a pixel to the left of the particular pixel to compute the predicted pixel value of the particular pixel.

The compression module 124 then determines residual values for the pixels by computing differences between actual values of the pixels and the corresponding predicted pixel values. For each pixel depicted in the digital image, the compression module 124 identifies a value of the pixel, predicts a value of the pixel, and computes a residual value for the pixel as a difference between the identified value the predicted value. For example, the compression module 124 identifies an actual value of the particular pixel, generates the predicted pixel value of the particular pixel, and determines a residual value for the particular pixel as a difference between the actual value and the predicted value of the particular pixel. In this example, the residual value for the particular pixel is representative of data usable to reproduce the actual value of the particular pixel given the predicted value of the particular pixel.

Consider an example in which the residual value for the particular pixel is also indicative of how well the pixel predictor generates the predicted value of the particular pixel. In this example, if the residual value for the particular pixel is relatively small and is representable using a relatively small number of bits, then this indicates that the predicted pixel value closely represents the actual value of the particular pixel. Similarly, if the residual value for the particular pixel is relatively large and is representable using a relatively large number of bits, then this is an indication that the predicted pixel value does not closely represent the actual value of the particular pixel.

The compression module 124 groups the residual values of the pixels into context groups of similar residual values. To do so in one example, the compression module 124 leverages a machine learning model such as a decision tree to group the residual values into the context groups. Each of the residual values is associated with a set of features and the compression module 124 uses these sets of features to cluster the residual values into the context groups. For example, pixels corresponding to residual values which are grouped together in a context group have similar statistical properties. In one example, pixels corresponding to residual values which are not grouped together in a context group have dissimilar statistical properties.

The compression module 124 leverages the statistical similarities of pixels corresponding to residual values included in each of the context groups and determines a pixel predictor for each of the context groups based on a compression criterion. Consider an example in which the compression module 124 determines whether a first pixel predictor or a second pixel predictor satisfies the compression criterion for a particular context group that includes three residual values corresponding to three pixels. In this example, the compression module 124 determines that the first pixel predictor generates predicted values of the three pixels such that corresponding new residual values of the three pixels are representable using 4 bits, 2 bits, and 3 bits. Thus, an average number of bits usable to represent the new residual values corresponding to the three pixels based on predicted values from the first pixel predictor is 3 bits.

Continuing this example, the compression module 124 determines that the second pixel predictor generates predicted values of the three pixels such that new residual values of the three pixels are representable using 2 bits, 2 bits, and 8 bits. Accordingly, an average number of bits usable to represent the new residual values corresponding to the three pixels based on the predicted values from the second pixel predictor is 4 bits. The compression module 124 determines that the first pixel predictor satisfies the compression criterion for the particular context group because the average number of bits usable to represent new residuals computed from predictions made using the first pixel predictor is less than the average number of bits usable to represent new residuals computed from predictions made using the second pixel predictor.

The compression module 124 determines a pixel predictor for each of the context groups by identifying which of the available pixel predictors generates predicted values for pixels corresponding to residual values included in each of the context groups such that new residual values computed from the predicted values are as small as possible. For example, the compression module 124 generates new predicted values for pixels corresponding to residual values included in each of the context groups using the pixel predictor determined for each of the context groups based on the compression criterion. The compression module 124 computes new residual values for the pixels by determining a difference between the actual values of the pixels and the new predicted values of the pixels.

In one example, the compression module 124 groups the new residual values into different context groups of similar new residual values and uses entropy coding based on the different context groups to generate the compressed data 128. Because the compression module 124 determined a pixel predictor of the available pixel predictors for each of the context groups based on the compression criterion, the compressed data 128 describes a representation of the digital image data 126 efficiently. In another example, the compression module 124 determines an additional pixel predictor of the available pixel predictors for each of the different context groups based on the compression criterion. In this example, the compression module 124 generates additional new predicted values for pixels corresponding to new residual values included in each of the different context groups using the additional pixel predictor determined for each of the different context groups. The compression module 124 computes additional new residual values as differences between the pixel values and the additional new predicted values and groups the additional new residual values into additional context groups. Continuing this example, the compression module 124 uses entropy coding based on the additional context groups to generate the compressed data 128.

The compression module 124 is capable of using the representation described by the compressed data 128 to completely reproduce the digital image data 126. For example, the completely reproduced digital image data 126 is made available to the client device via the network. In this example, the download data 120 includes the reproduced digital image data 126.

Although the compression module 124 is illustrated to be included in the computing device 102, it is to be appreciated that in other examples the compression module 124 is included in the client dive 106 and/or in the cloud storage 108. In some examples, the computing device 102 generates the compressed data 128 and the cloud storage 108 receives the compressed data 128. In other examples, the cloud storage 108 generates the compressed data 128 and the computing device 102 receives the compressed data 128. In one example, the client device 106 generates the compressed data 128 and the cloud storage 108 receives the compressed data 128. For example, the client device 106 receives the compressed data 128 from the cloud storage via the network 104.

Figure 2:
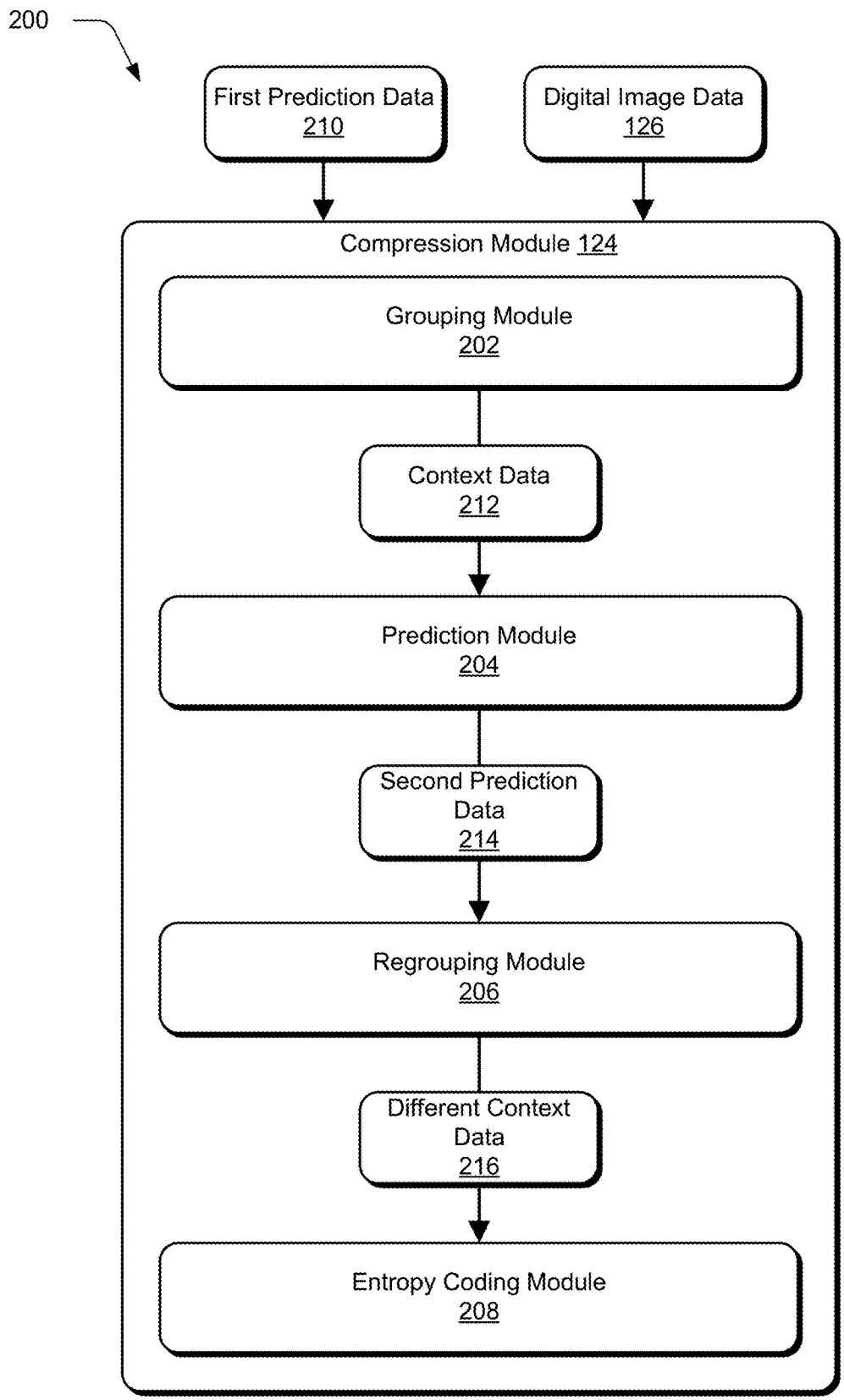
FIG. 2 depicts a system in an example implementation showing operation of a compression module for digital image compression using context-based pixel predictor selection.
Figure 3A:
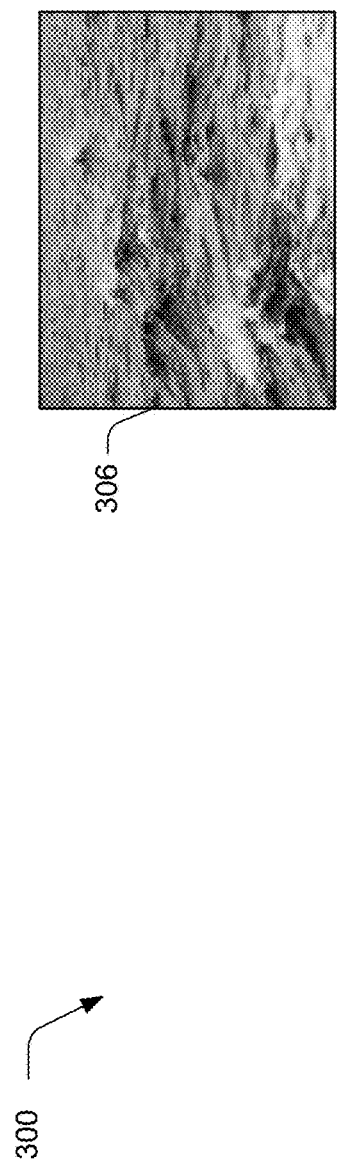
Figure 3B:
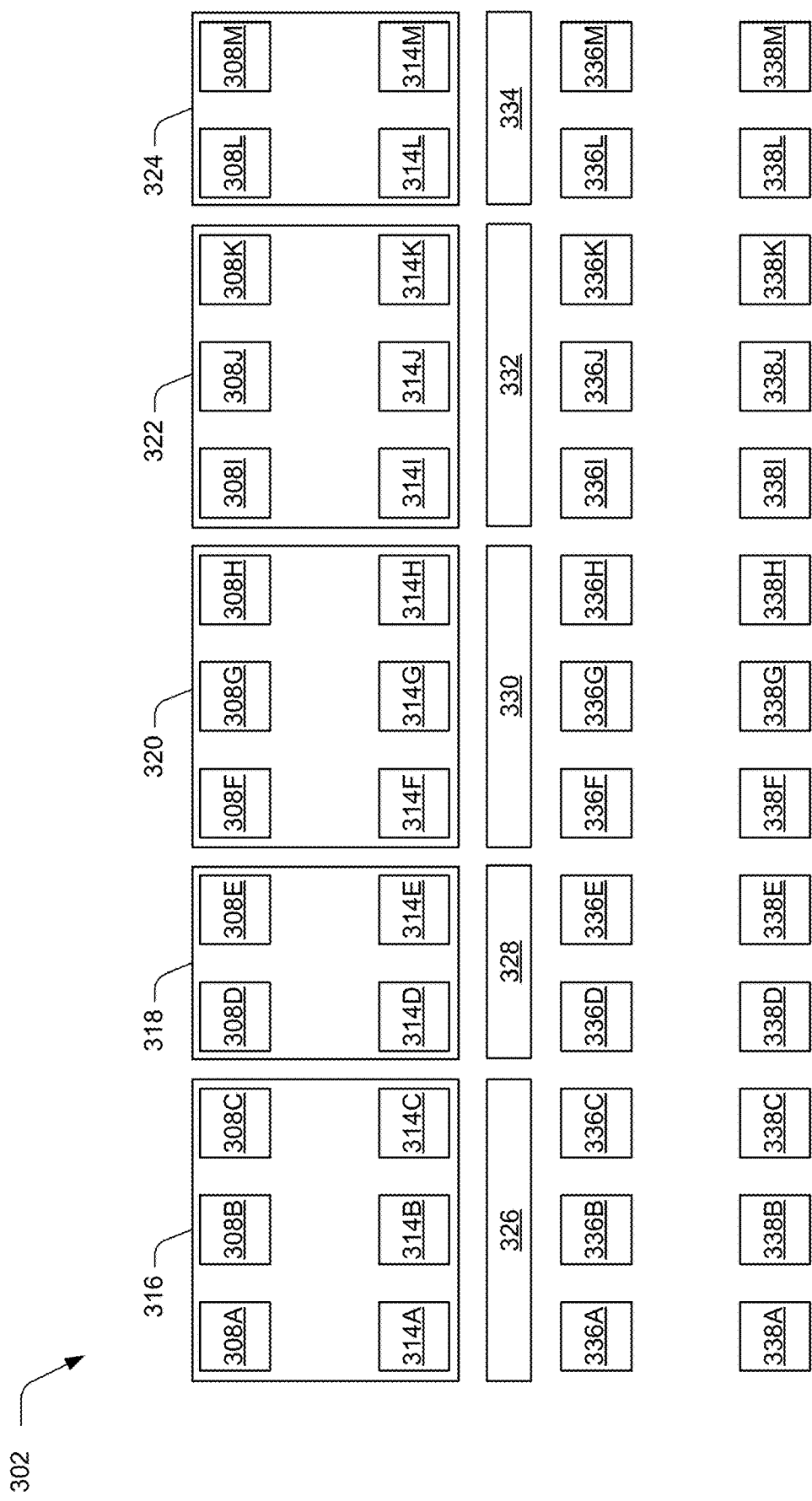

FIG. 2 depicts a system 200 in an example implementation showing operation of a compression module 124. The compression module 124 is illustrated to include a grouping module 202, a prediction module 204, a regrouping module 206, and an entropy coding module 208. FIGS. 3A, 3B, and 3C illustrate an example of grouping residual values of pixels into context groups, determining a pixel predictor for each of the context groups, and grouping new residual values of the pixels into different context groups. FIG. 3A illustrates a representation 300 in which residual values are computed for pixels as a difference between pixel values of the pixels and predicted pixels values of the pixels. FIG. 3B illustrates a representation 302 showing pixels corresponding to residual values grouped into context groups. FIG. 3C illustrates a representation 304 in which new residual values corresponding to the pixels are grouped into different context groups.

With reference to FIG. 2 and FIG. 3A, the compression module 124 receives the digital image data 126 as an input which describes a digital image 306 and pixel values 308A-308M of pixels depicted in the digital image 306. In one example, the digital image data 126 describes RGB(A) color space and the compression module 124 converts the RGB (A) color space to YCoCg(A) color space to improve color decorrelation. In the illustrated example, the compression module 124 receives first prediction data 210 as an input which describes predicted pixel values 310A-310M predicted for each of the pixel values 308A-308M by a pixel predictor 312. However, in other examples, the compression module 124 generates the first prediction data 210 by using the pixel predictor 312 to generate the predicted pixel values 310A-310M. For example, the pixel predictor 312 is representative of a scanline traversal method for predicting pixel values. In this example, the pixel predictor 312 generates predicted pixel value 310A using a pixel above a pixel having the pixel value 308A and a pixel left of the pixel having the pixel value 308A.

The grouping module 202 receives the digital image data 126 and the first prediction data 210 and processes the digital image data 126 and the first prediction data 210 to generate residual values 314A-314M. To do so, the grouping module 202 computes the residual values 314A-314M as differences between the predicted pixel values 310A-310M and the pixel values 308A-308M. For example, residual value 314A is a difference between the predicted pixel value 310A and the pixel value 308A. Accordingly, the residual value 314A is usable to reproduce the pixel value 308A given the predicted pixel value 310A.

As shown in FIG. 3B, the pixel values 308A-308M correspond to the residual values 314A-314M which the grouping module 202 groups into context groups 316-324. In one example, each of the residual values 314A-314M is associated with a set of properties and the grouping module 202 groups the residual values 314A-314M into the context groups 316-324 based on these properties. For example, the grouping module 202 generates a potential context group for each combination of the properties associated with the residual values 314A-314M. In this example, the grouping module 202 leverages a decision tree which is constructed as the digital image 306 is encoded. This decision tree includes decision nodes and leaf nodes in one example.

In this example, the decision nodes are used to route the residual values 314A-314M to potential context groups based on properties of each potential context group. The residual values 314A-314M are encoded in the leaf nodes which are convertible to decision nodes as the pixel values 308A-308M are encoded in scanning order. For example, each of the leaf nodes maintains a number of potential context groups and this number is equal to a number of properties of one of the residual values 314A-314M encoded in each leaf node. The grouping module 202 converts a leaf node to a decision node when one of the potential context groups indicates that splitting the leaf node improves compression performance. The grouping module 202 determines whether splitting the leaf node improves the compression performance by operating as if the leaf node is already split and evaluating the compression performance.

In one example, the grouping module 202 constructs the decision tree as a quadtree. In another example, the grouping module 202 constructs the decision tree as an octree. For example, the grouping module 202 uses a Gaussian mixture model to cluster the residual values 314A-314M into the context groups 316-324. In this example, the grouping module 202 estimates a number of context groups, clusters the residual values 314A-314M into the estimated number of context groups using Gaussian mixture model clustering, evaluates cluster performance (e.g., based on a measure of entropy), and splits context clusters based on this evaluation.

Consider an example in which the grouping module 202 groups the residual values 314A-314M into the context groups 316-324 using a clustering method that assigns each of the residual values 314A-314M to one of the context groups 316-324. In this example, the grouping module 202 clusters the residual values 314A-314M into non-assigned context groups 316-324 which have been assigned similar residual values. The grouping module 202 evaluates compression performance of the non-assigned context groups 316-324 and identifies a best performing context group. This best performing context group is then further clustered in an iterative manner By grouping the residual values 314A-314M into the context groups 316-324 in this way, each of the context groups 316-324 includes a set of the residual values 314A-314M having similar statistical properties.

For example, pixel values 308A, 308B, and 308C correspond to residual values 314A, 314B, and 314C which are grouped into context group 316 while pixel values 308D and 308E correspond to residual values 314D and 314E which are grouped into context group 318. As illustrated in the representation 302, context group 320 includes residual values 314F, 314G, and 314H which correspond to pixel values 308F, 308G, and 308H, respectively; context group 322 includes residual values 314I, 314J, and 314K which correspond to pixel values 308I, 308J and 308K, respectively; and context group 324 includes residual values 314L and 314M which correspond to pixel values 308L and 308M, respectively. The grouping module 202 generates context data 212 which describes the pixel values 308A-308M and corresponding residual values 314A-314M included in the context groups 316-324.

The prediction module 204 receives the context data 212 and processes the context data 212 to generate second prediction data 214. To do so, the prediction module 204 determines a pixel predictor 326-334 for each of the context groups 316-324 based on a compression criterion. In one example, the compression criterion is satisfied by a particular pixel predictor for a particular context group if an average number of bits usable to represent residual values computed from predicted pixel values generated by the particular pixel predictor for pixels corresponding to residual values included in the particular context group is less than an average number of bits usable to represent residual values computed from predicted pixel values generated by any other available pixel predictor for the pixels corresponding to the residual values included in the particular context group. For example, the prediction module 204 determines which of the available pixel predictors 326-334 satisfies the compression criterion for each of the context groups 316-324.

Consider an example in which the prediction module 204 determines whether pixel predictor 326 or pixel predictor 334 satisfies the compression criterion with respect to the pixel values 308A, 308B, 308C corresponding to the residual values 314A, 314B, 314C included in the context group 316. In this example, the prediction module 204 generates predicted pixel values 336A, 336B, 336C using the pixel predictor 326 and also using the pixel predictor 334. The prediction module 204 then determines an average number of bits usable to represent new residual values 338A, 338B, 338C computed from predicted pixel values 336A, 336B, 336C generated by each of the pixel predictors 326, 334.

Continuing this example, the new residual values 338A, 338B, 338C computed from predicted pixel values 336A, 336B, 336C generated by the pixel predictor 326 are representable by 5 bits, 15 bits, and 10 bits, respectively. Accordingly, an average number of bits usable to represent the new residual values 338A, 338B, 338C computed from predicted pixel values 336A, 336B, 336C generated by the pixel predictor 326 is 10 bits. For example, the new residual values 338A, 338B, 338C computed from predicted pixel values 336A, 336B, 336C generated by the pixel predictor 334 are representable by 17 bits, 7 bits, and 12 bits, respectively. Thus, an average number of bits usable to represent the new residual values 338A, 338B, 338C computed from predicted pixel values 336A, 336B, 336C generated by the pixel predictor 334 is 12 bits.

In the previous example, the prediction module 204 determines that the pixel predictor 326 satisfies the compression criterion for the context group 316 for a set of available pixel predictors which includes the pixel predictor 326 and the pixel predictor 334. This is because the average number of bits usable to represent the new residual values 338A, 338B, 338C computed from predicted pixel values 336A, 336B, 336C generated by the pixel predictor 326 is less than the average number of bits usable to represent the new residual values 338A, 338B, 338C computed from predicted pixel values 336A, 336B, 336C generated by the pixel predictor 334. In the illustrated example, the prediction module 204 determines that an average number of bits usable to represent the new residual values 338A, 338B, 338C computed from predicted pixel values 336A, 336B, 336C generated by each of the pixel predictors 328, 330, and 324 is greater than 10 bits. Accordingly, the prediction module 204 determines that the pixel predictor 326 satisfies the compression criterion for the context group 316.

As shown in FIG. 3B, the prediction module 204 determines that pixel predictors 328, 330, 332, and 334 satisfy the compression criterion for context groups 318, 320, 322, and 324, respectively. The prediction module 204 generates the predicted pixel values 336A, 336B, and 336C for the pixel values 308A, 308B, and 308C, respectively, using the pixel predictor 326. The prediction module 204 generates predicted pixel values 336D and 336E for the pixel values 308D and 308E, respectively, using pixel predictor 328; the prediction module 204 generates predicted pixel values 336F, 336G, and 336H for the pixel values 308F, 308G, and 308H, respectively, using pixel predictor 330; the prediction module 204 generates predicted pixel values 336I, 336J, and 336K for the pixel values 308I, 308J, and 308K, respectively, using pixel predictor 332; and the prediction module 204 generates predicted pixel values 336L and 336M for the pixel values 308L and 308M, respectively, using pixel predictor 334.

The prediction module 204 computes the new residual values 338A, 338B, and 338C as differences between the predicted pixel values 336A, 336B, and 336C and the pixel values 308A, 308B, and 308C, respectively. Similarly, the prediction module 204 computes new residual values 338D and 338E as differences between predicted pixel values 336D and 336E and pixel values 308D and 308E, respectively; the prediction module 204 computes new residual values 338F, 338G, and 338H as differences between predicted pixel values 336F, 336G, and 336H and pixels values 308F, 308G, and 308H, respectively; the prediction module 204 computes new residual values 338I, 338J, and 338K as differences between predicted pixel values 336I, 336J, and 336K and pixel values 308I, 308J, and 308K, respectively; and the prediction module 204 computes new residual values 338L and 338M as differences between predicted pixel values 336L and 336M and pixel values 308L and 308M, respectively. The prediction module 204 generates the second prediction data 214 as describing the predicted pixel values 336A-336M and the new residual values 338A-338M.

With reference to FIG. 2 and FIG. 3C, the regrouping module 206 receives the second prediction data 214 and processes the second prediction data 214 to generate different context data 216. For example, the regrouping module 206 groups the new residual values 338A-338M into context groups 340-348. In one example, the regrouping module 206 groups the new residual values 338A-338M into context groups 340-348 in a manner which is similar or identical to a manner in which the grouping module 202 groups the residual values 314A-314M into context groups 316-324. In another example, the regrouping module 206 groups the new residual values 338A-338M into context groups 340-348 in a manner which is different from the manner in which the grouping module 202 groups the residual values 314A-314M into context groups 316-324.

As shown in FIG. 3C, context group 340 includes the new residual value 338A corresponding to the pixel value 308A and the new residual value 338B corresponding to the pixel value 308B. Context group 342 includes the new residual value 338C corresponding to the pixel value 308C and the new residual value 338D corresponding to the pixel value 308D. Context group 344 includes new residual values 338E, 338F, 338G, 338H which correspond to pixel values 308E, 308F, 308G, 308H, respectively. Context group 346 includes new residual values 338I, 338J which correspond to pixel values 308I, 308J, respectively. Context group 348 includes new residual values 338K, 338L, 338M which correspond to pixel values 308K, 308L, 308M, respectively. The regrouping module 206 generates the different context data 216 as describing the context groups 340-348 and the pixel values 308A-308M corresponding to the new residual values 338A-338M included in the context groups 340-348. The entropy coding module 208 receives the different context data 216 and processes the different context data 216 to generate the compressed data 128 which is illustrated as a representation 350 of the digital image 306.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 4:
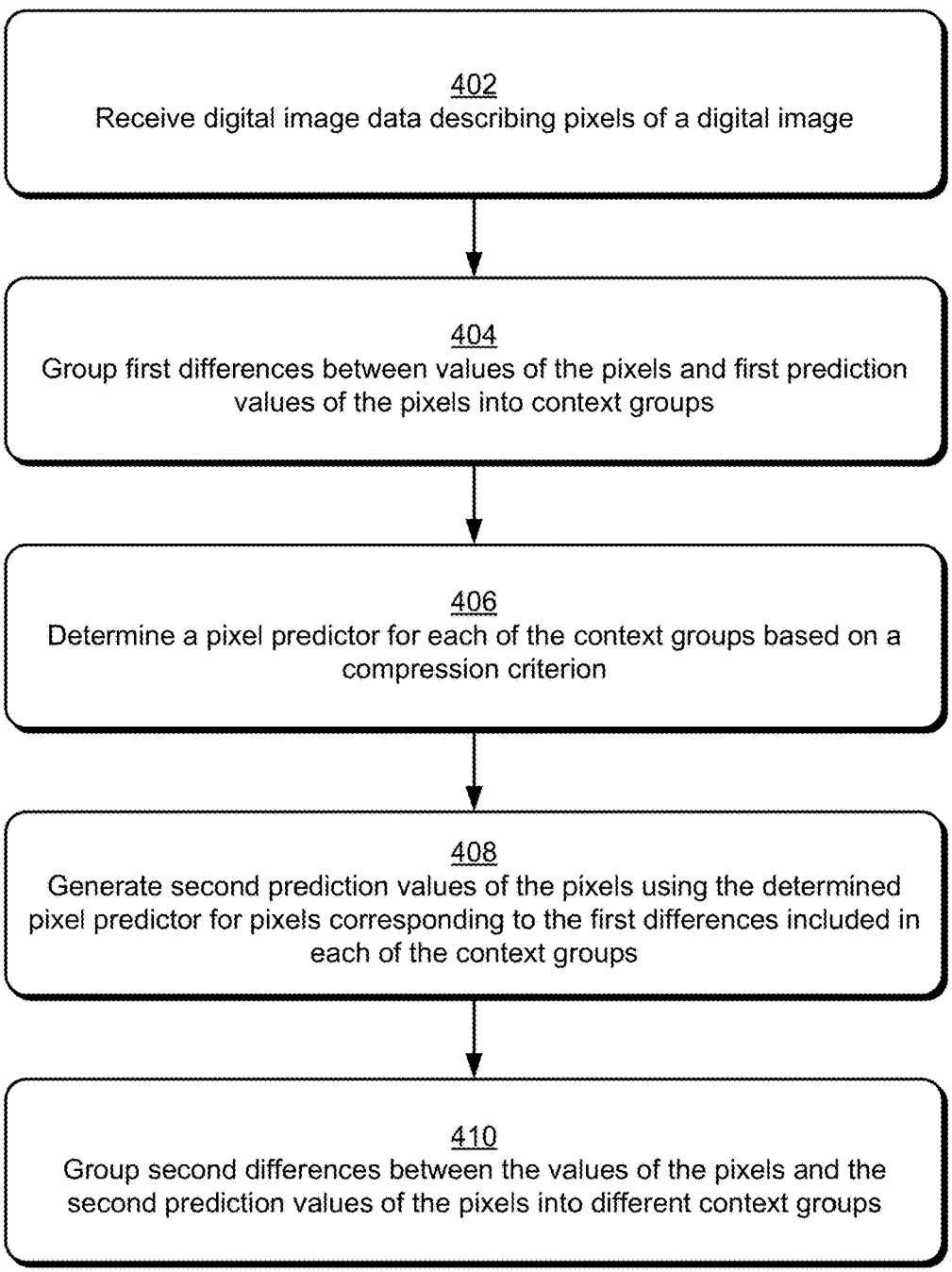
FIG. 4 is a flow diagram depicting a procedure in an example implementation in which digital image data describing pixels of a digital image is received, first differences between values of the pixels and first prediction values are grouped into context groups, and second differences between the values of the pixels and second prediction values are grouped into different context groups.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-3. FIG. 4 is a flow diagram depicting a procedure 400 in an example implementation in which digital image data describing pixels of a digital image is received, first differences between values of the pixels and first prediction values are grouped into context groups, and second differences between the values of the pixels and second prediction values are grouped into different context groups. Digital image data describing pixels of a digital image is received (block 402). The computing device 102 implements the compression module 124 to receive the digital image data in one example.

First differences between values of the pixels and first prediction values of the pixels are grouped into context groups (block 404). For example, the compression module 124 groups the first differences into the context groups. A pixel predictor is determined for each of the context groups based on a compression criterion (block 406). In one example, the computing device 102 implements the compression module 124 to determine the pixel predictor for each of the context groups.

Second prediction values of the pixels are generated using the determined pixel predictor for pixels corresponding to the first differences included in each of the context groups (block 408). The compression module 124 generates the second prediction values of the pixels in one example. Second differences between the values of the pixels and the second prediction values of the pixels are grouped into different context groups (block 410). For example, the compression module 124 groups the second differences into the different context groups.

Figure 5:
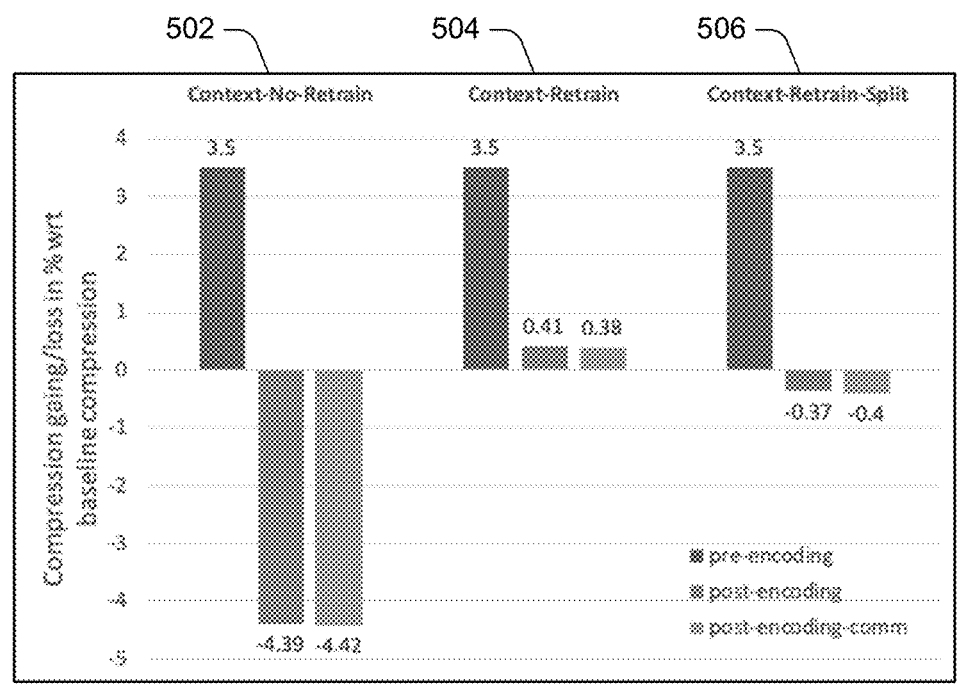
FIG. 5 illustrates an example representation of compression performance on a corpus of digital images using variations of the described systems.

FIG. 5 illustrates an example representation 500 of compression performance on a corpus of digital images using variations of the described systems. As shown in FIG. 5, the representation 500 includes a comparison of compression performance of first 502, second 504, and third variations 506 of the described systems in relation to a baseline system. The baseline system is a free lossless image format ("FLIF") system and the digital image corpus includes 10 digital images having resolution ranges from 1K to approximately 5K. The digital image corpus includes both synthetic and photographic digital images.

The three standard FLIF pixel predictors were used in the evaluation. The first pixel predictor computes an average of pixel values of pixels above and below a target pixel for a horizontal step and computes an average of pixel values of pixels left and right of the target pixel for a vertical step. The second pixel predictor computes a median of a predicted value using the first pixel predictor, a gradient calculated as a sum of pixel values of pixels above and left of the a target pixel minus a product of the pixel values of the pixels above and left of the target pixel, and a gradient calculated as either a sum of pixel values of pixels left of and below the target pixel minus a product of the pixel values of the pixels left of and below the target pixel or a sum of pixel values of pixels above and right of the target pixel minus a product of the pixel values of the pixels above and right of the target pixel. The third pixel predictor computes a median of three pixel values of pixels that neighbor the target pixel. These three pixels are either left of the target pixel, right of the target pixel, above the target pixel, or below the target pixel.

The comparison is presented in terms of numbers of bits usable to express residual values of pixels depicted in the digital images of the image corpus. The numbers of these bits are presented pre-encoding and post-encoding with and without overhead introduced by the predictors. For presentation of the compression performance, differences between performance of the variations 502, 504, 506 and FLIF system are shown in percentages such that a positive value indicates superior performance of the variations 502, 504, 506 and a negative value indicates superior performance of the FLIF system.

In the first variation 502 of the described systems, predicted pixel values are generated for pixel values of pixels depicted in the digital images and residual values are computed as difference between the predicted pixel values and the pixel values. The residual values are grouped into context groups. For each of these context groups, one of the three available pixel predictors is determined based on the compression criterion and the determined pixel predictor is used to generate new predicted pixel values for pixels corresponding to residual values included in each of the context groups. New residuals computed using the new predicted pixel values are not regrouped into different context groups in the first variation 502. Rather, the first variation 502 uses entropy coding based on the original context groups.

The second variation 504 is identical to the first variation 502 until a step which follows using the determined pixel predictor to generate new predicted pixel values for pixels included in each of the context groups. In the second variation 504, new residual values are computed using the new predicted pixel values and the new residual values are grouped into different context groups. The second variation 504 uses entropy coding based on the different context groups.

The third variation 506 is identical to the first variation 502 until a step which follows using the determined pixel predictor to generate new predicted pixel values for pixels included in each of the context groups. In the third variation 506, new residual values are computed using the new predicted pixel values and the new residual values are grouped into new context groups by performing a context modeling operation based on the determined pixel predictor. For example, the context modeling operation groups the new residual values into context groups in which new residual values included in a particular context group are calculated from new predicted pixel values generated by a specific pixel predictor of the available pixel predictors. The third variation 506 uses entropy coding based on the pixel predictor based context modeling.

As shown, each of the variations 502, 504, 506 outperforms the FLIF compression system by 3.5 percent in the pre-encoding comparison. The first variation 502 underperforms the baseline system by 4.42 percent and 4.39 percent for the post-encoding comparison with and without overhead introduced by the pixel predictors, respectively. This is because the new predicted pixel values and corresponding residual values have altered distributions relative to distributions which were grouped into the context groups. The second variation 504 outperforms the FLIF system by 0.38 percent and 0.41 percent for the post-encoding comparison with and without overhead introduced by the pixel predictors, respectively. The third variation 506 underperforms relative to the baseline system by 0.4 percent and 0.37 percent for the post-encoding comparison with and without overhead introduced by the pixel predictors, respectively.

Example System and Device

Figure 6:
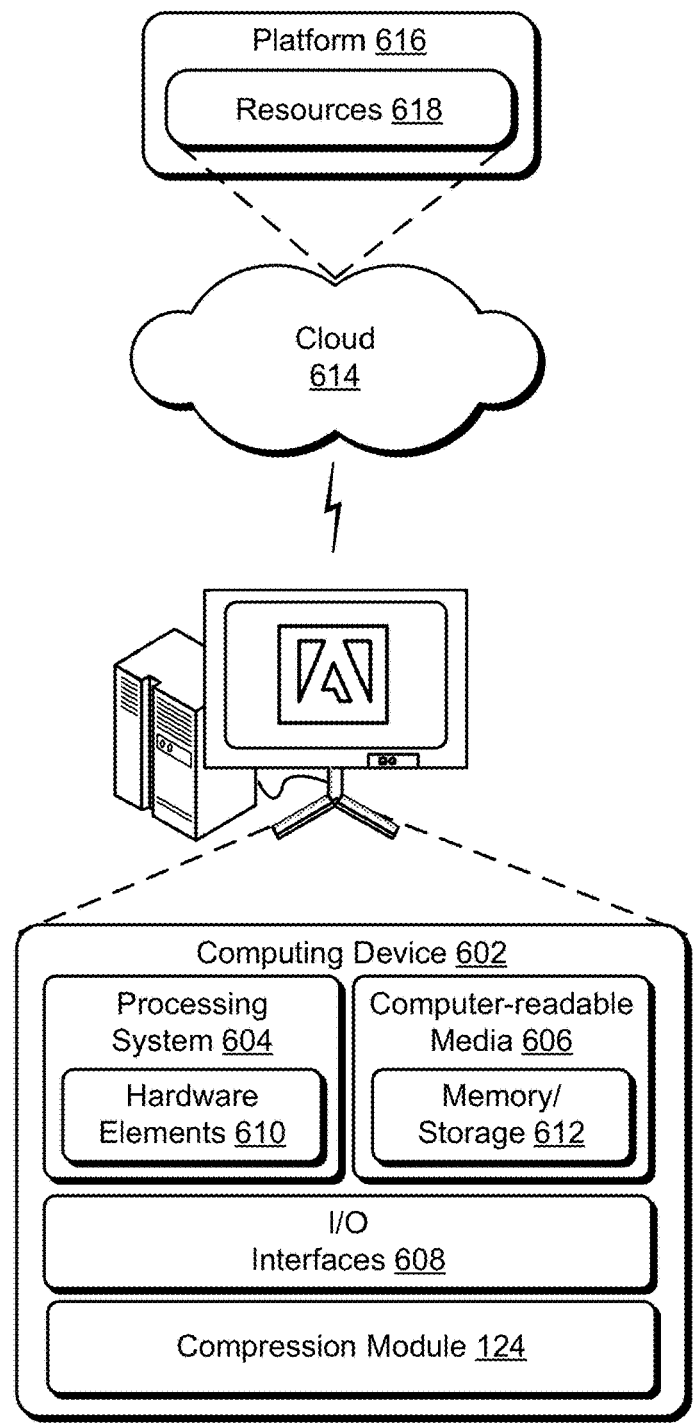
FIG. 6 illustrates an example system that includes an example computing device that is representative of one or more computing systems and/or devices for implementing the various techniques described herein.

FIG. 6 illustrates an example system 600 that includes an example computing device that is representative of one or more computing systems and/or devices that are usable to implement the various techniques described herein. This is illustrated through inclusion of the compression module 124. The computing device 602 includes, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that are configured as processors, functional blocks, and so forth. This includes example implementations in hardware as an application specific integrated circuit or other logic device formed using one or more semiconductors. The hardware elements 610 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 606 is illustrated as including memory/storage 612. The memory/storage 612 represents memory/storage capacity associated with one or more computer-readable media. In one example, the memory/storage component 612 includes volatile media (such as random access memory (RAM)) and/or nonvolatile media (such as read only memory (ROM), Flash memory, optical disks, magnetic disks, and so forth). In another example, the memory/storage component 612 includes fixed media (e.g., RAM, ROM, a fixed hard drive, and so on) as well as removable media (e.g., Flash memory, a removable hard drive, an optical disc, and so forth). The computer-readable media 606 is configurable in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 602. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 602, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 610. For example, the computing device 602 is configured to implement particular instructions and/or functions corresponding to the software and/or hardware modules. Accordingly, implementation of a module that is executable by the computing device 602 as software is achieved at least partially in hardware, e.g., through use of computer-readable storage media and/or hardware elements 610 of the processing system 604. The instructions and/or functions are executable/operable by one or more articles of manufacture (for example, one or more computing devices 602 and/or processing systems 604) to implement techniques, modules, and examples described herein.

The techniques described herein are supportable by various configurations of the computing device 602 and are not limited to the specific examples of the techniques described herein. This functionality is also implementable entirely or partially through use of a distributed system, such as over a "cloud" 614 as described below.

The cloud 614 includes and/or is representative of a platform 616 for resources 618. The platform 616 abstracts underlying functionality of hardware (e.g., servers) and software resources of the cloud 614. For example, the resources 618 include applications and/or data that are utilized while computer processing is executed on servers that are remote from the computing device 602. In some examples, the resources 618 also include services provided over the Internet and/or through a subscriber network, such as a cellular or Wi-Fi network.

The platform 616 abstracts the resources 618 and functions to connect the computing device 602 with other computing devices. In some examples, the platform 616 also serves to abstract scaling of resources to provide a corresponding level of scale to encountered demand for the resources that are implemented via the platform. Accordingly, in an interconnected device embodiment, implementation of functionality described herein is distributable throughout the system 600. For example, the functionality is implementable in part on the computing device 602 as well as via the platform 616 that abstracts the functionality of the cloud 614.

CONCLUSION

Although implementations of systems for digital image compression using context-based pixel predictor selection have been described in language specific to structural features and/or methods, it is to be understood that the appended claims are not necessarily limited to the specific features or methods described. Rather, the specific features and methods are disclosed as example implementations of systems for digital image compression using context-based pixel predictor selection, and other equivalent features and methods are intended to be within the scope of the appended claims. Further, various different examples are described and it is to be appreciated that each described example is implementable independently or in connection with one or more other described examples.

What is claimed is:

1. In a digital medium environment for compressing digital images, a method implemented by a computing device, the method comprising:
  receiving, by the computing device, digital image data describing pixels of a digital image;
  grouping, by the computing device, first differences between values of the pixels and first prediction values of the pixels into context groups;
  determining, by the computing device, a pixel predictor for each of the context groups based on a compression criterion;
  generating, by the computing device, second prediction values of the pixels using the determined pixel predictor for pixels corresponding to the first differences included in each of the context groups; and grouping, by the computing device, second differences between the values of the pixels and the second prediction values of the pixels into different context groups.

2. The method as described in claim 1, further comprising compressing the digital image using entropy coding based on the different context groups.

3. The method as described in claim 2, wherein compressing the digital image is a lossless compression.

4. The method as described in claim 2, wherein compressing the digital image is a lossy compression.

5. The method as described in claim 2, wherein the entropy coding is context adaptive binary arithmetic coding.

6. The method as described in claim 1, wherein the compression criterion is an average number of bits usable to describe the second differences between the values of the pixels and the second prediction values of the pixels.

7. The method as described in claim 1, further comprising converting a color space of the pixels from RGB(A) to YCoCg(A) for color decorrelation before grouping the first differences into the context groups.

8. The method as described in claim 1, wherein grouping the first differences into the context groups is performed using a binary tree.

9. The method as described in claim 1, wherein grouping the first differences into the context groups is performed using a quadtree.

10. The method as described in claim 1, wherein grouping the first differences into the context groups is performed using an octree.

11. The method as described in claim 1, wherein grouping the first differences into the context groups is performed using Gaussian mixture model clustering.

12. The method as described in claim 1, further comprising:
   determining an additional pixel predictor for each of the different context groups based on the compression criterion;
   generating third prediction values of the pixels using the determined additional pixel predictor for pixels corresponding to the second differences included in each of the different context groups; and
   grouping third differences between the values of the pixels and the third prediction values of the pixels into additional context groups.

13. In a digital medium environment for compressing digital images, a system comprising:
   a grouping module implemented at least partially in hardware of a computing device to:
      receive digital image data describing pixels of a digital image; and
      group first differences between values of the pixels and first prediction values of the pixels into context groups;
   a prediction module implemented at least partially in the hardware of the computing device to:
      determine a pixel predictor for each of the context groups based on a compression criterion; and
      generate second prediction values of the pixels using the determined pixel predictor for pixels corresponding to the first differences included in each of the context groups;
   a regrouping module implemented at least partially in the hardware of the computing device to group second differences between the values of the pixels and the second prediction values of the pixels into different context groups; and
   an entropy coding module implemented at least partially in the hardware of the computing device to compress the digital image using entropy coding based on the different context groups.

14. The system as described in claim 13, wherein the compression criterion is an average number of bits usable to describe the second differences between the values of the pixels and the second prediction values of the pixels.

15. The system as described in claim 13, wherein the entropy coding is context adaptive binary arithmetic coding.

16. The system as described in claim 13, wherein the grouping module is implemented to group the first differences into the context groups using a binary tree, a quadtree, or an octree.

17. The system as described in claim 13, wherein the grouping module is implemented to group the first differences into the context groups using Gaussian mixture model clustering.

18. One or more computer-readable storage media comprising instructions stored thereon that, responsive to execution by a computing device, causes the computing device to perform operations including:
   receiving digital image data describing pixels of a digital image;
   generating first prediction values of the pixels;
   grouping first differences between values of the pixels and the first prediction values of the pixels into context groups;
   determining a pixel predictor for each of the context groups based on a compression criterion;
   generating second prediction values of the pixels using the determined pixel predictor for pixels corresponding to the first differences included in each of the context groups; and
   grouping second differences between the values of the pixels and the second prediction values of the pixels into different context groups.

19. The one or more computer-readable storage media as described in claim 18, the operations further including compressing the digital image using entropy coding based on the different context groups.

20. The one or more computer-readable storage media as described in claim 18, wherein compressing the digital image is a lossless compression.

\* \* \* \* \*